United States Patent [19]
Caldwell

[11] 3,800,145
[45] Mar. 26, 1974

[54] METHOD AND APPARATUS FOR RADIOACTIVE WELL LOGGING

[75] Inventor: Richard L. Caldwell, Dallas, Tex.

[73] Assignee: Mobil Oil Corporation, New York, N.Y.

[22] Filed: May 19, 1972

[21] Appl. No.: 255,112

[52] U.S. Cl............................. 250/253, 250/497
[51] Int. Cl.............................................. G21g 3/00
[58] Field of Search ....... 250/84.5, 83.6 W, 83.6 PS

[56] References Cited
UNITED STATES PATENTS

| | | | |
|---|---|---|---|
| 3,254,211 | 5/1966 | Black | 250/43.5 FL |
| 2,303,688 | 12/1942 | Fearon | 250/84.5 |
| 3,388,253 | 6/1968 | Mills | 250/84.5 |
| 3,389,257 | 6/1968 | Caldwell et al. | 250/84.5 |

*Primary Examiner*—Harold A. Dixon
*Attorney, Agent, or Firm*—Andrew L. Gaboriault; William D. Jackson

[57] ABSTRACT

A radiation source for use in radioactive well logging and logging methods employing such source. The source comprises emitter and target components which are movable relative to one another. Both components may take the form of concentrically disposed inner and outer casings or sleeves. Each component includes a plurality of laterally spaced surfaces with those of the emitter component containing an emitter material and those of the target component containing a target material which is characterized by the emission of primary radiation in response to exposure to radiation from the emitter material. Means are provided for moving the emitter and target components to an active position in which complementing surfaces are adjacent one another to provide for the emission of primary radiation and an inactive position in which the surfaces are displaced longitudinally from one another.

7 Claims, 3 Drawing Figures

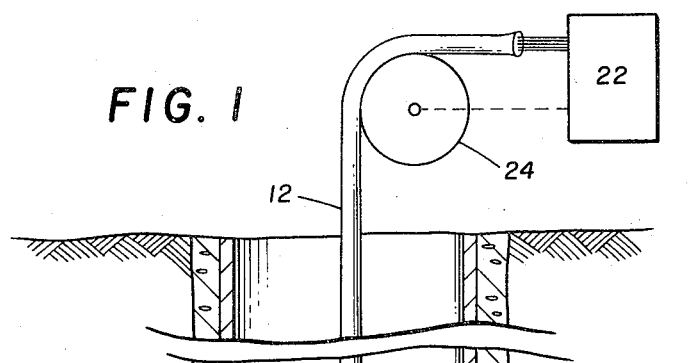
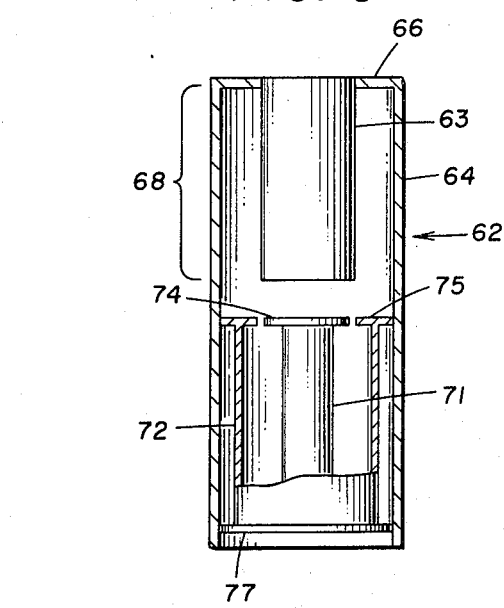
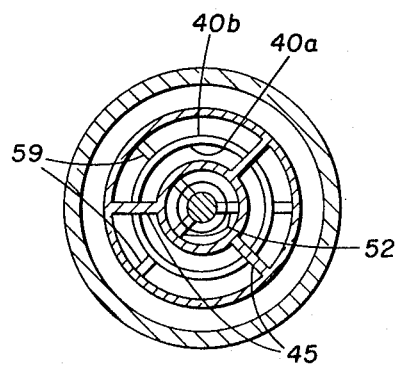
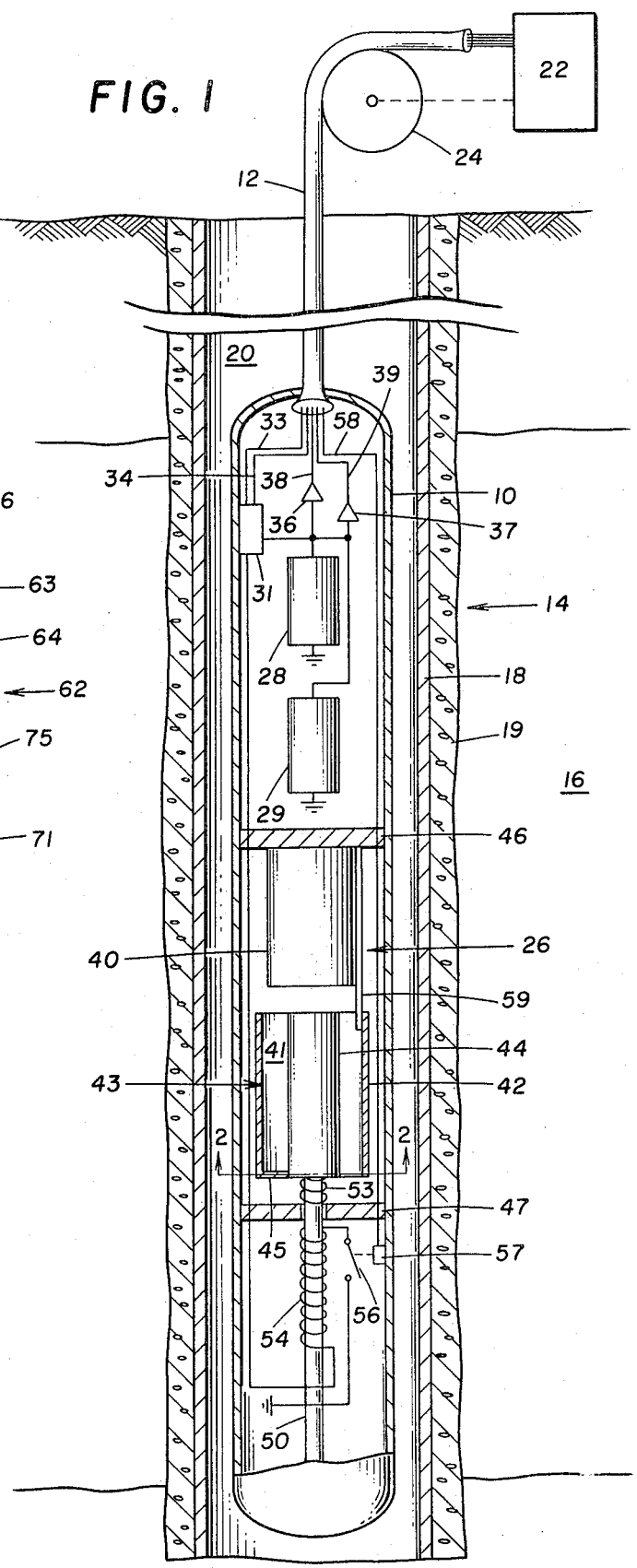

METHOD AND APPARATUS FOR RADIOACTIVE WELL LOGGING

BACKGROUND OF THE INVENTION

This invention relates to radioactive well logging and more particularly to primary radiation sources of the chemical type for use in continuous radioactive well logging.

In the petroleum industry various radioactive well logging techniques have been employed or proposed in order to characterize subterranean formations with regard to factors such as porosity, oil, fresh water, or salt water content, and lithology. Perhaps the mode widely used of the radioactive logging procedures are the neutron logging techniques in which the formation under investigation is irradiated with neutrons and the resulting secondary radiation measured in order to characterize the formation. The neutron irradiation may be by means of a continuous source or a pulsed source and the secondary radiation detected typically will take the form of thermal or epithermal neutrons or gamma rays such as may result from inelastic scattering reactions or neutron capture. In pulsed neutron logging the formation is bombarded with repetitive time-spaced bursts of fast neutrons and the resulting secondary radiation is measured at selected time intervals, normally by gating the output of the detector, in order to arrive at a decay parameter. In continuous neutron logging, the neutron source is operated continuously and the detectors are likewise operated continuously such that detection of secondary radiation occurs simultaneously with the primary neutron irradiation.

The neutron sources employed in radioactive well logging normally are of the accelerator type employing the deuterium-tritium reaction to produce neutrons or of the chemical type such as those employing the action of alpha particles from an emitter material such as polonium on a neutron emitter material such as beryllium. The accelerator type neutron sources have a high energy, high intensity mono-energetic neutron output but they are relatively expensive and suffer the further disadvantage that the neutron output varies widely and unpredictably in intensity. The relatively less expensive chemical sources have a relatively constant neutron output which decays slowly and predictably with time.

Mechanically controlled chemical sources have been employed in pulsed neutron logging applications which can accommodate relatively low neutron outputs. For example, U.S. Pat. No. 3,388,253 to Mills discloses a mechanically pulsed source in which a target material such as beryllium is located in the interior of a container. A longitudinally spaced emitter material such as antimony-124 (a gamma ray emitter) is adapted for insertion into the container. Thus, the container is reciprocated between a position in which the emitter material is inserted into the container and a remote position in which the emitter material is withdrawn from the container in order to produce time-spaced bursts of neutrons. U.S. Pat. No. 3,389,257 to Caldwell et al. discloses a mechanically pulsed source in which alpha emitting and neutron emitting target materials are mounted within a chamber which is filled with a gas such as helium that is readily penetrated by alpha particles. The target material is periodically exposed to alpha particles by suitable control means such as an apertured shutter. Yet another mechanically operated source is disclosed in U.S. Pat. No. 2,303,688 to Fearon. In this system an alpha emitting material such as radiothorium, mesothorium, or radon is disposed within a cylinder formed of a neutron emitting material such as boron or beryllium. A cylindrical shield is mounted on a reciprocating rod such that it can be removed from the cylinder to expose it to alpha irradiation or inserted therein in order to shield the neutron emitting material from alpha irradiation.

Mechanically operated chemical sources of configurations such as those described above are suitable for use in pulsed neutrons logging with its relatively low neutron output requirements. However, for continuous neutron logging, such as may be employed to determine the porosity of a formation, relatively high neutron outputs are required. Thus it has been the practice in continuous neutron logging operations to employ either accelerator sources or chemical sources in which the alpha emitting material and the neutron emitting material are mixed together. While these sources are relatively inexpensive in comparison to accelerator sources, they present serious hazards in handling since the sources are continually emitting neutrons even when withdrawn from a well and not in use.

SUMMARY OF THE INVENTION

In accordance with the present invention, there is provided a new and improved continuous radiation source for use in a radioactive logging tool. The source comprises emitter and target components which are movable relative to one another. The emitter component includes a first set of laterally spaced surfaces which extend longitudinally of the logging tool. The target component includes a second set of laterally spaced surfaces which likewise extend longitudinally of the logging tool. This latter set of surfaces contains a target material which is characterized by the emission of primary radiation in response to exposure to radiation emitted by an emitter material on the first set of surfaces. The system further includes means for causing relative movement between the emitter component and the target component between an active position in which the first and second sets of surfaces are adjacent one another and an inactive position in which the sets of surfaces are displaced longitudinally from one another.

In logging a well, a logging tool including a radiation source as described above and one or more radiation detectors are located within the well. A formation under investigation is continuously irradiated with primary radiation resulting from placement of the target and emitter components in the active position. Simultaneously with the irradiation step, the resulting secondary radiation is detected and correlated with depth. When the logging procedure is completed, the source is placed in the inactive position so that the tool may be safely withdrawn from the well for handling and storage on the surface.

BRIEF DESCRIPTION OF THE DRAWINGS

FIG. 1 is an illustration partly in section showing a logging system embodying one form of the present invention.

FIG. 2 is a cross-sectional view taken along line 2—2 of FIG. 1.

FIG. 3 is an illustration partly in section showing a modified form of a source in accordance with the present invention.

DESCRIPTION OF SPECIFIC EMBODIMENTS

With reference to FIG. 1, there is shown a well logging system embodying the primary radiation source of the present invention. The invention will be described with reference to its employment in a neutron logging tool of the type employing two spaced radiation detectors. A logging tool of this type may be employed to obtain a porosity log as explained in detail in U.S. Pat. No. 3,491,238 to Allen. However, it is to be recognized that the invention also may be employed in other logging techniques which involve the use of a continuous radiation source.

More particularly, and with reference to FIG. 1, there is illustrated a logging tool 10 which is suspended from a cable 12 within a well 14 traversing a subterranean formation 16. The well is lined with casing 18 and cement 19 and normally will be filled with a fluid 20 such as drilling mud, water, or oil. Signals are transmitted between the tool 10 and an uphole control and recording unit 22 by means of conductors within the cable 12. As the tool is moved through the well, a depth indicating means such as a measuring sheave 24 produces a depth signal which is applied to the surface unit 22 thus providing for correlation between the downhole measurements and the depths at which they are taken. The logging tool 10 comprises a primary radiation source 26 for continuously irradiating the formation under investigation and two spaced detectors 28 and 29 for detecting secondary radiation resulting from the primary irradiation of the formation. The radiation detectors 28 and 29 may comprise helium–3 counter thermal neutron detectors as disclosed in the aforementioned patent to Allen, or the radiation detectors may be responsive to other types of radiation such as gamma rays associated with inelastic scattering or thermal neutron capture. A power source 31 is located within the logging tool and functions to supply power to the detectors 28 and 29. Power is supplied from the surface to the downhole power source by means of conductors 33 and 34 within cable 12. The outputs from detectors 28 and 29 are applied to amplifiers 36 and 37, respectively, and then to surface unit 22 by means of conductors 38 and 39 in the cable.

Th neutron source 26 comprises a first component 40 which takes the form of a hollow cylindrical sleeve and a second component 42 which serves as a receptacle for component 40. Component 42 comprises an outer cylindrical casing 43 (shown in section) and an inner cylindrical casing 44. The casings 43 and 44 are secured together by means of a spider connection 45 in order to define an annular space 41 which is adapted to receive sleeve 40. The inner and outer surfaces 40a and 40b (shown in FIG. 2) of sleeve 40 are coated with alpha-particle emitting material such as polonium–210, plutonium–238, americium–241, curium–242, or curium–244. Polonium–210 and curium–242 normally will be preferred where a high specific activity is desired. Curium–244 is especially suitable where a somewhat lower specific activity can be tolerated since its 18—year half life will allow for a longer source life. Desirably the alpha emitting material will be coated over substantially the entire inner and outer surfaces of sleeve 40 in order to provide a maximum active surface area. For example, sleeve 40 may comprise a steel cylinder upon which polonium is deposited by an electrodepositional technique.

The outer surface of casing 44 and the inner surface of casing 43 are formed of a target material which is characterized by the emission of fast neutrons in response to irradiation by alpha particles. A suitable target material for this embodiment of the invention is beryllium and if desired the casings 43 and 44 may take the form of thin cylinders of beryllium or a beryllium alloy. Alternatively, the casings 43 and 44 may be formed of a metal such as copper and brass and the inner surface and outer surface respectively of casings 43 and 44 coated with beryllium. The chamber in which the target and emitter components are located is closed by gas impermeable bulkheads 46 and 47. The bulkhead 46 which provides a support for the emitter component 40 is formed of a suitable shielding material such as lead in order to reduce the transmission of neutrons directly from the source to the detectors. The chamber in which the components are located preferably is filled with a gas such as helium which, as disclosed in the aforementioned patent to Caldwell et al., is readily penetrated by alpha particles.

The neutron source also includes means for moving the target component 42 from the inactive position shown in FIG. 1 upward so that the two components are in an active position in which emitter component 40 is inserted or received within annulus 41. This means includes a permanently magnetized shaft 50 which extends through a gas-tight seal in bulkhead 47 and is secured to the target component by means of a spider connection 52 (shown in FIG. 2). Component 42 is biased toward the inactive position by means of a tension spring 53 connected between spider 52 and bulkhead 47. A solenoid coil 54 is connected to downhole power unit 31 through a switch 56. This switch may be opened and closed by a solenoid 57 which is connected for operation at the surface by means of conductor 58. With the downhole power supply ON, the switch 56 may be closed by an operator at the surface to cause shaft 50 to move upwardly against the bias of spring 53 until the target component abuts against bulkhead 46, thus placing the source components in the active position for the logging operation.

When the source is in the active position, the inner and outer surfaces of emitter component 40 are adjacent to but laterally spaced from the outer surface of casing 44 and the inner surface of casing 43, respectively. Thus, the beryllium surfaces are bombarded with alpha particles from the emitter component to produce the primary neutron radiation. As shown in FIGS. 1 and 2, the emitter component is provided with a plurality of longitudinally extending ribs 59. These ribs serve to ensure that the spacings between the adjacent emitter and target surfaces are maintained, thus avoiding direct contact between these surfaces, and also to provide means for guiding the target component as it moves relative to the emitter component. The ribs may be formed of any suitable inactive material which is not abrasive with respect to the target surfaces.

Upon completion of the logging operation and before withdrawing the tool from the well, switch 56 is opened thus allowing target component 42 to fall to the inactive position shown. Also, should the downhole power supply fail for any reason, the target component will automatically return to the inactive position and remain there under the bias of spring 53. If desired, the system may also be provided with detent means (not shown) for latching the target component in the respective inactive and—with power ON and switch 56 closed—active positions.

The radiation source of the present invention offers a number of distinct advantages. By providing a plurality of longitudinally coextensive emitter and target surfaces, a relatively high radiation output may be obtained for any given longitudinal and lateral dimensions of the source. This is particularly advantageous in such applications as porosity logging techniques since the longitudinal dimension of the source may be kept to a low value, thus enabling the source to more closely approximate a "point" source of neutrons. In addition, it enables employment of the source in a relatively small diameter logging tool of the type used in "through tubing" logging operations. Also with the emitter and target components in the longitudinally spaced inactive position, any emitter material which may break free from the emitter surfaces will tend to collect on the surfaces then adjacent the emitter component rather than on the surfaces of the target material. This is particularly important since certain emitter materials such as polonium-210 are highly unstable and tend to migrate. The deposition of such particles on the target material would of course result in a continuous neutron output even though the components are in an inactive position.

Although the system of FIG. 1 has been described with reference to the location of emitter material on the surfaces of component 40 and target material on the surfaces of component 42, it will be understood that this disposition of materials may be reversed. Also it will be recognized that the actuating means may be coupled to the insert component 40 with the receptacle component 42 remaining stationary.

Turning now to FIG. 3, there is illustrated an embodiment of the present invention in which the radiation output of the source is even further enhanced. FIG. 3 also illustrates a further aspect of the invention in which an emitter component or target component is provided with a transverse shoulder at a location such that it is interposed between the target and emitter materials when the source is in an inactive position.

As shown in FIG. 3, the source comprises a target component 62 comprised of concentrically disposed inner and outer casings 63 and 64 which are connected together by a spider 66. The upper portion, as indicated by bracket 68, of the inner surface of casing 64 and both the inner and outer surfaces of casing 63 contain a target material such as beryllium. The portion of casing 64 below bracket 68 is composed of an inert material such as copper or brass. Slidably disposed relative to casings 63 and 64 is an emitter component comprising concentric inner and outer sleeves 71 and 72, respectively. The outer surface of sleeve 71 and the inner and outer surfaces of sleeve 72 are coated with an emitter material as described above and are connected to an actuating means (not shown) so that they may be moved upwardly from the inactive position shown to an active position. The sleeves 71 and 72 are provided with transverse shoulders 74 and 75, respectively, which are formed of a material impervious to alpha particles. These shoulders, in addition to serving as guides to maintain the desired spacings adjacent the emitter and target surfaces, function to collimate the output from the emitter surfaces, thus reducing even further the exposure of the target surfaces to the emitter radiation when the source is in the inactive position. The lower end of sleeve 72 also is provided with a corresponding shoulder 77. This shoulder is provided simply to serve as a guide since downward transmission of radiation from the emitter surfaces is not harmful.

I claim:

1. In a radiation source for use in a radioactive well logging tool, the combination comprising:

emitter means forming a first set of a plurality of laterally spaced surfaces extending longitudinally of said logging tool and each containing an emitter material characterized by the emission of radiation, target means forming a second set of a plurality of laterally spaced surfaces extending longitudinally of said logging tool and each containing a target material characterized by the emission of primary radiation in response to exposure to radiation from said emitter material, means mounting said emitter and target means for relative movement between a first active position in which said first set of surfaces are adjacent said second set of surfaces and a second inactive position in which said first set of surfaces are displaced longitudinally from said second set of surfaces, actuating means for placing said emitter and target means in said first active position, means for selectively energizing said actuating means, and means continuously biasing said emitter and target means longitudinally apart whereby said emitter and target means are automatically placed in said second inactive position when said actuating means is de-energized.

2. The combination of claim 1 wherein said emitter material is characterized by the emission of alpha particles and said target material is characterized by the emission of fast neutrons in response to irradiation with alpha particles.

3. In a radiation source for use in a radioactive well logging tool, the combination comprising:

a receptacle comprising an outer casing and a smaller inner casing disposed within said outer casing to define an annulus, an insert adapted for insertion into said annulus whereby said insert when in place within said annulus and said receptacle define pairs of adjacent surfaces exposed to each other, said insert having a smaller dimension in cross section than said annulus whereby the adjacent surfaces of said insert and said receptacle are spaced from one another, emitter material characterized by the emission of radiation located in a first set of said adjacent surfaces on one of said receptacle and insert, target material characterized by the emission of primary radiation in response to exposure to radiation from said emitter material located in a second set of said adjacent surfaces on the other of said receptacle and insert and complementing said first set, means mounting said insert and receptacle for relative movement between a first position in which said insert is within said receptacle and a second position longitudinally spaced from said first position in which said insert is withdrawn from said receptacle, actuating means for placing said receptacle and insert in said first position, means for selectively energizing said actuating means, and means continuously biasing said receptacle and insert longitudinally apart whereby said emitter and target means are automatically placed in said second position when said actuating means is de-energized.

4. The combination of claim 3 wherein said insert means comprises an outer sleeve adapted for insertion into said receptacle annulus as recited in claim 3 and an inner smaller sleeve disposed within said outer sleeve and adapted for insertion into said inner casing, said inner sleeve having a smaller dimension in cross section than the interior of said inner casing wherein the adjacent surfaces of said inner sleeve and inner casing are spaced from one another, emitter material characterized by the emission of radiation located in one of the adjacent surfaces of said inner sleeve and inner casing, and target material characterized by the emission of primary radiation in response to exposure to radiation from said emitter material located in the other of the adjacent surfaces of said inner sleeve and inner casing.

5. The combination of claim 3 wherein said emitter material is characterized by the emission of alpha particles and said target material is characterized by the emission of fast neutrons in response to irradiation with alpha particles.

6. The combination of claim 5 further comprising a transverse shoulder formed of a material impervious to alpha particles and disposed on one of said insert and receptacle at a location interposed between said emitter material and said target material when said insert is withdrawn from said receptacle.

7. In the radioactive logging of a well, the method comprising:

a. locating within said well a logging tool having a primary radiation source comprising a first set of a plurality of laterally spaced surfaces extending longitudinally of said logging tool and each containing an emitter material characterized by the emission of alpha particles and a second set of a plurality of laterally spaced surfaces extending longitudinally of said logging tool and each containing a target material characterized by the emission of fast neutrons in response to irradiation with alpha particles, b. continuously irradiating at least one formation traversed by said well with fast neutrons resulting from the placement of said source in an active position in which said first set of surfaces are adjacent to said second set of surfaces, c. simultaneously with step (b) detecting secondary radiation attendant to the neutron irradiation of said formation, d. terminating said irradiation by placing said source in an inactive position in which said first set of surfaces are displaced longitudinally relative to said second set of surfaces and in which a transverse shoulder impervious to alpha particles is interposed between said first and second set of surfaces, and e. withdrawing said tool from the well with said source in the inactive position.

* * * * *